United States Patent [19]
Vallejos

[11] Patent Number: 5,970,934
[45] Date of Patent: Oct. 26, 1999

[54] LOW PROFILE INTERNAL COMBUSTION ENGINE

[75] Inventor: Tony E. Vallejos, Spokane, Wash.

[73] Assignee: Alto Automotive, Inc., Deerfield, Ill.

[21] Appl. No.: 09/058,438

[22] Filed: Apr. 9, 1998

Related U.S. Application Data

[62] Division of application No. 08/536,422, Sep. 29, 1995, Pat. No. 5,738,057.

[51] Int. Cl.⁶ ........................................................ F01L 1/18
[52] U.S. Cl. ..................................... 123/90.44; 123/90.27; 123/90.33
[58] Field of Search ............................. 123/90.27, 90.33, 123/90.39, 90.41, 90.44

[56] References Cited

U.S. PATENT DOCUMENTS

| | | |
|---|---|---|
| 1,481,962 | 1/1924 | Irvin . |
| 1,535,449 | 4/1925 | Cain . |
| 1,699,659 | 1/1929 | Fagan . |
| 1,805,670 | 5/1931 | Miller . |
| 2,033,810 | 3/1936 | Bernard . |
| 2,254,438 | 9/1941 | Mccarthy . |
| 2,672,135 | 3/1954 | Kosche . |
| 4,178,903 | 12/1979 | Yanagihara et al. . |
| 4,291,662 | 9/1981 | Nakamura et al. . |
| 4,318,376 | 3/1982 | Nakamura et al. . |
| 4,457,273 | 7/1984 | Andrews . |
| 4,557,231 | 12/1985 | Thery . |
| 4,567,752 | 2/1986 | Yunick . |
| 4,617,818 | 10/1986 | Luders ................................. 123/90.39 |
| 4,669,431 | 6/1987 | Simay . |
| 4,768,467 | 9/1988 | Yamada et al. ....................... 123/90.44 |
| 4,846,138 | 7/1989 | Vallejos . |
| 5,063,889 | 11/1991 | Pryba et al. . |
| 5,101,778 | 4/1992 | Fukuo et al. . |
| 5,392,744 | 2/1995 | Regueiro . |
| 5,398,649 | 3/1995 | Shimamoto . |
| 5,732,669 | 3/1998 | Fischer et al. ....................... 123/90.39 |

FOREIGN PATENT DOCUMENTS

| | | |
|---|---|---|
| 277244 | 9/1927 | United Kingdom . |
| WO 91/01437 | 2/1991 | WIPO . |

OTHER PUBLICATIONS

"Designing Engine Combustion Chambers", Reports on research dated Oct. 1984, pp. 2 and 4.
"Valve Location Classification"; Auto Mechanics Fundamentals, date unknown, page unknown.
"What causes Detonation?" Engine Classification, parts Identification, date unknown, p. 159.

*Primary Examiner*—Weilun Lo
*Attorney, Agent, or Firm*—Leydig, Voit & Mayer, Ltd.

[57] ABSTRACT

An internal combustion engine of the valve-in-head type having a low profile cylinder head which requires minimal head-room in the engine compartment of an automotive vehicle The cylinder head has a rectilinear configuration with the valve trains disposed on horizontal axes extending transversely of the cylinder head. Each valve train in the cylinder head is provided with precise axial support at both ends of the train. The engine has a relatively thin upstanding combustion chamber over each cylinder and one or more pairs of poppet valves per cylinder each having a sealing surface adjacent its outer edge for engagement with respective seats defined by axially aligned header tubes. Each valve has a relatively short neck extending through the combustion chamber during the intake and compression strokes and when the fuel-air mixture is fired. The valve spring of each valve train is situated between a fixed abutment attached to the side wall of the cylinder head and the end of the valve cage remote from the poppet valves.

4 Claims, 13 Drawing Sheets

COMPRESSION

EXHAUST

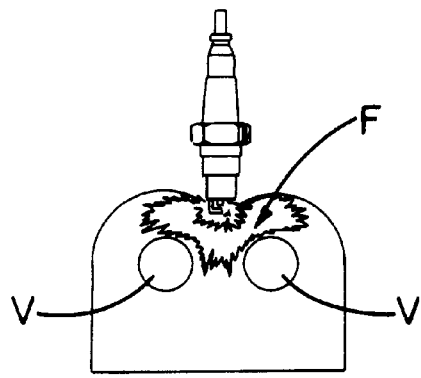
FIG. 7
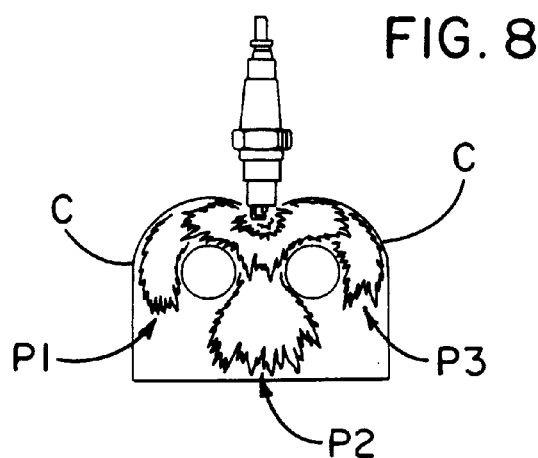
FIG. 8
FIG. 9
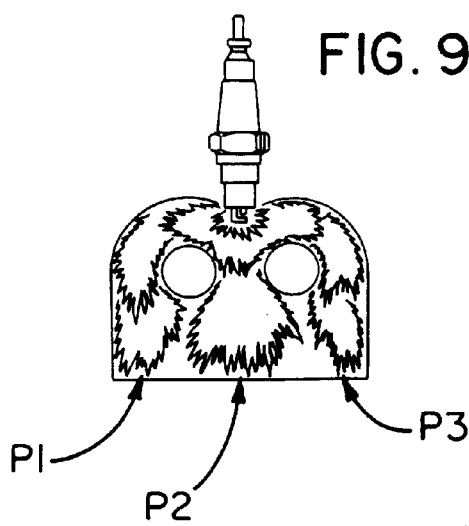
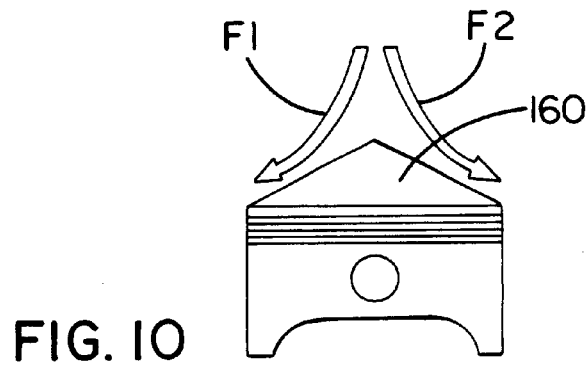
FIG. 10

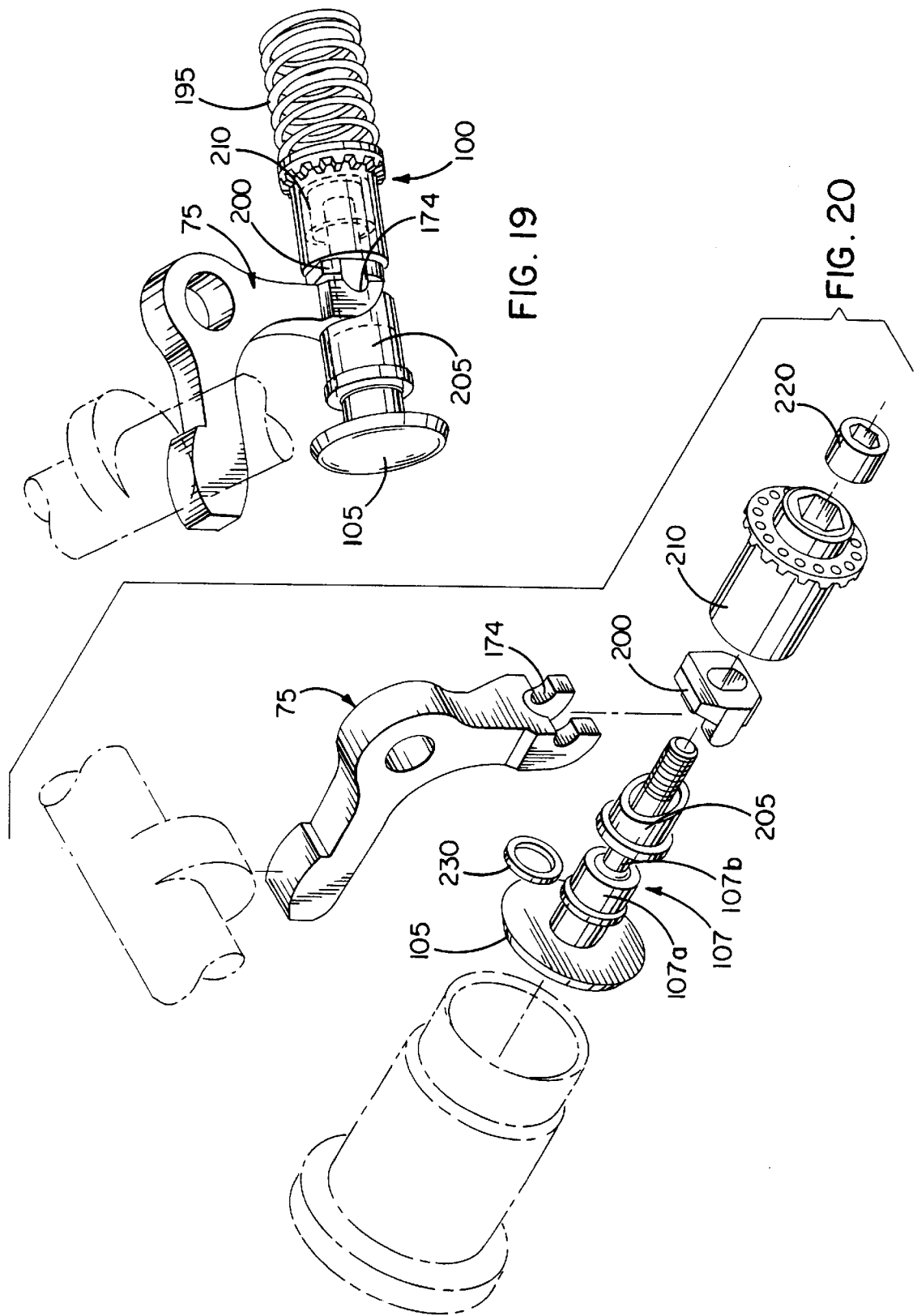

LOW PROFILE INTERNAL COMBUSTION ENGINE

This application is a division of Ser. No. 08/536,422, filed Sep. 29, 1995 now U.S. Pat. No. 5,738,057.

FIELD OF THE INVENTION

The invention relates generally to an internal combustion engine, and more particularly to such an engine having improved fuel efficiency and emissions characteristics.

BACKGROUND OF THE INVENTION

Internal combustion engines derive power from a controlled combustion of a mixture of a hydro-carbon based fuel and air inside a combustion chamber. A primary goal of any engine design is to increase fuel efficiency and performance while reducing emissions. A more complete combustion reduces emissions such as unburned hydrocarbons, (referred to herein "THC" emissions) as well as carbon dioxide ($CO_2$) and carbon monoxide (CO). Of course, while complete combustion is desired, design trade offs must be made since the processes leading to the most complete combustion may have negative side effects. For example, if the peak temperature of combustion is too high, undue $NO_x$ emissions will be formed during combustion and be exhausted. In addition, for a very hot flame front in the presence of cooler spots in the combustion chamber or compression end of the cylinder, so-called "knock" may occur, thus reducing engine performance. Of course, a myriad of other considerations go into the design of any engine.

One means of increasing fuel efficiency while reducing emissions is to provide a relatively fast burn of the combustion charge. The idea underlying such a design is that a faster burn will be more complete since the charge constituents (fuel and air) will preferably be close to the point at which combustion is initiated when they are burned. So-called fast burn is typically achieved by virtue of engine designs which seek to minimize the surface-to-volume ratio (S/V) of the combustion chamber. The smaller S/V thus promotes a fast burn. By "fast burn" it is meant that the combustion is such that most of the pressure exerted on the piston by combustion is exerted over a small portion of the piston's travel which occurs just following ignition of the charge. Thus, while the high heat of the fast burn is advantageous in that it gives a more complete burning of the hydrocarbons, it may have the disadvantage of leading to engine roughness and vibration by virtue of such a large force being exerted during a small portion of the piston travel. Moreover, such an engine must be designed such that the peak temperature of combustion is high enough to get the desired hydrocarbon burning, but not so high as to generate undue $NO_x$.

Another approach to achieving more complete combustion for fuel efficiency and emissions purposes is to increase the homogeneity of the charge. A combustion charge may not be completely homogeneous, meaning that certain regions are more volatile than others leading to uneven combustion. In one engine, to prevent such problems, the fuel-air mixture was subjected to an induced swirling motion prior to ignition to increase the thoroughness of the mixture. As shown in U.S. Pat. No. 4,846,138 this swirling was induced by the valve stems extending across a thin, upstanding combustion chamber during the compression stroke of the flat-headed piston. The valve stems serve to induce a swirl in the fuel-air mixture being compressed leading to a more thorough mixing. Further, during the power stroke, the same configuration of the valve stems causes the flame front to swirl around these stems again improving the combustion. As discussed in that patent, the swirling induced by this configuration improved gas mileage and emissions for that engine.

The swirling during combustion in the engine according to the '138 patent was also beneficial in removing unburned hydrocarbons from the walls of the cylinder. Since the walls of the piston cylinder are typically cooler than the internal volume of the cylinder, unburned hydrocarbon molecules may cling to these walls during combustion. The swirling induced by the valve stems in the '138 patent help to sweep that charge around these cooler walls, thus assisting in removing unburned hydrocarbons. Such "scrubbing" of combustion chamber walls is thus a desirable feature for reducing such emissions.

While the extreme temperatures under which combustion typically occurs are advantageous in terms of burning the fuel efficiently, it has other draw backs which must be compensated for in the engine design. One example is in the valves associated with the combustion chamber. In a typical engine configuration, the intake and exhaust valves are disposed within the intake and exhaust ports which they are sealing. This is particularly disadvantageous in the case of the exhaust valve since that valve sits in the stream of hot exhaust gas as it leaves the combustion chamber and exits through the exhaust port to the exhaust manifold. Alternatively, the intake valve is almost continually subject to vacuum. Further, because of the configuration of conventional valves and their position relative to the cam shaft, typical valves are very long and have thin stems. Since flow to the stem away from the valve head is one means of heat transfer and dissipation, this means that a long thermal distance must be traversed to effectively draw heat away from the head in this manner. Further, the stems are typically very thin, meaning that only a small radiating surface is available for radiating heat in the stem. The other mechanism for cooling standard valves is flow from the head into the valve seat. Of course, this mechanism is unavailable when the valve is open and not in contact with the seat. Because typical valves are required to withstand incredibly high temperatures without having adequate mechanisms for withstanding such temperatures, they are typically formed of expensive and exotic materials so that they can successfully withstand the elevated temperatures. It would thus be desirable to avoid the undue expense and complexity of having to use such exotic materials for the valves.

A further consideration in regard to the valves is lubrication. A valve is generally actuated from a rotating cam shaft. In a typical single overhead cam, the cam contacts a cam pad at the end of a rocker arm. This contact causes the rocker arm to move the valve out of engagement with its respective port. The cam pads on the rocker arm, however, are typically located above the cam shaft, since the valves must be pulled out of engagement with their respective ports. As a result, lubricating this contact is problematic. Any oil that is thrown up to lubricate the cam/cam pad contact simply runs off due to gravity. A typical dual overhead cam arrangement suffers from similar problems. There, a cam engages the angled top surface of a bucket which houses the valve spring. Any oil thrown onto the top surface of the bucket also runs off due to gravity. While the cams are sufficiently lubricated to allow the engine to function, such lubrication is less than ideal and works against gravity, thus requiring an oversupply of oil to achieve lubrication.

The lubrication mechanism for the valve train itself is also less than ideal although it works for its intended purpose.

Since the valves reciprocate in a bearing sleeve, there must be lubrication between the valve and the sleeve. This lubrication is typically carried out by a planned or intentional leakage of oil between the valve and the valve sleeve and past the valve seals. Thus, the valve seals are designed to have less than ideal sealing characteristics. In the case of the intake valve, the controlled leakage of oil in this manner is somewhat assisted by the fact that the intake port is constantly containing vacuum in the intake port. This assists in drawing lubricating oil between the bearing sleeve and the valve. Of course, this has the draw back of insuring that at least a small amount of oil is burned during each combustion cycle of a conventional engine. The exhaust valve, on the other hand, does not have such a mechanism for assisting in the movement of oil between the valve and the bearing sleeve. Because of the lack of such a mechanism this means that the exhaust valve and intake valve in a given engine typically see different amounts of oil, and are thus lubricated differently. Indeed, because of this, exhaust valves fail at a significantly higher rate than intake valves. In addition, the only way for oil in the bearing sleeve of an exhaust valve to exit is to be exhausted through the exhaust port during the exhaust strike of the piston with which a given valve is associated. This has negative impact in terms of emissions.

Lubrication of a typical valve train assembly is thus a difficulty which must be taken into account in engine design. Clearly, the system works, but extreme measures must be taken to compensate for the disadvantages of such systems.

SUMMARY OF THE INVENTION

It is thus a primary aim of the invention to improve upon the structure of the internal combustion engine disclosed in U.S. Pat. No. 4,846,138 to yield an engine that is more efficient than those provided heretofore, both in terms of combustion and valve performance.

In accord with that aim, it is a principal object of the present invention to provide a more complete combustion of the charge during the power stroke.

It is a related object to both improve the mixing of the charge prior to combustion, and to improve the removal of clinging fuel from the walls of the combustion chamber and cylinder during combustion.

Another related object is to provide both vertical and horizontal components to a swirling charge during combustion.

It is a further related object to provide a smooth and even burn of the charge.

Still another object is reducing emissions generated during the combustion process.

Another object of the invention is to provide for cooler valves than in existing engines.

It is a related object to provide valves with short, efficient heat paths.

It is a further related object to provide a circulating medium to carry heat away from the valves.

Another principal object of the invention is to provide a lubrication system for the valves and the valve-actuation mechanism that is assisted by the force of gravity.

A related object is to provide a system where the contact between the cam shaft and cam pad is adequately lubricated.

In accord with these and other objects of the invention, an internal combustion engine is provided that uses the geometry of a combustion chamber, cylinder head, piston crown and valve necks extending across the combustion chamber, to provide thorough mixing of the charge by a swirling action before combustion, and to provide a thorough and "smooth, even" burn of the charge after ignition by a complex vertical and horizontal swirling action that scrubs clinging fuel from the walls of the combustion chamber and cylinder and provides a burn that maintains a higher pressure over a longer period of piston travel. The piston crown in the internal combustion engine is tapered to a zenith which is coincident with the longitudinal axis of the piston. A complementary interior surface is present in the cylinder head at the compression end of the cylinder. Also provided is a thin upstanding combustion chamber disposed vertically above the compression end of the cylinder and including a throat in communication with the interior surface of the cylinder head. The combustion chamber is divided into two sections which are offset with respect to the longitudinal axis. The sectioning of the combustion chamber and the offsetting of those sections aids in inducing the complex swirling of the charge during the compression and power strokes of the piston. Associated with each section of the combustion chamber is a poppet valve which is disposed transversely to the longitudinal axis such that the stem of each valve extends across each combustion section. Each poppet valve also includes a head and neck region, with the head selectively engaging a port in the opposite wall of the combustion chamber section. A resilient member is coupled to each valve for biasing it into engagement with its respective port during the power and compression strokes to further induce swirling of the charge.

This configuration gives the advantageous functional characteristics referred to above during the compression and power strokes. During compression, the foregoing geometry results in the poppet valve necks serving as swirl sources to the compressing fuel-air mixture and thus inducing a substantially vertical swirling of that mixture. A similar swirling of the flame front occurs during combustion. At the same time, a complemental substantially horizontal swirling is induced and sustained by the two offset adjacent sections of the combustion chamber in combination with the tapered piston head and the complementally-shaped interior surface in the cylinder head. The separation of the chambers effectively divides the flame front into two sections during combustion. As the flame fronts emerge from the combustion chamber, they contact the tapered region of the crown. This causes the flame fronts to be thrown against the cylindrical walls of the cylinder, thereby aiding in providing a horizontal component to the swirl. As the piston withdraws, this complex swirling motion continues, thus scrubbing unburned hydrocarbons from the cylinder walls. Further, the initial restriction of the combustion to the two halves of the combustion chamber, followed by entry of the flame fronts into the cylinder, provides a slower, more even burning of the charge than in previous engines.

According to a further feature of the invention, hollow valves are advantageously provided. These valves are larger in diameter than stock valves and include an interior hollow region. Both the large exterior diameter, and the hollow interior provide substantial radiative cooling surfaces. Further, oil is circulated through and around the hollow valves to provide for removal of heat through the medium of the oil. Further, the valves are not located in the ports which they seal as in conventional engines. This also leads to cooler valves since, for example, the exhaust valve is exposed to the cool intake charge. Because of the enhanced cooling of these valves, exotic fabricating materials are not required.

Further according to the invention, an internal combustion engine is provided that uses the configuration and, optionally, the orientation, of the valve train to adequately lubricate the valve train and take advantage of the effects of gravity. In one embodiment, a rocker arm is mounted beneath the cam shaft for pivotal movement. One arm of the rocker arm includes a cam pad for engaging a cam on the cam shaft. Another arm includes a valve-engaging end, such that a pivotal motion of the rocker arm causes movement of the valve. The rocker arm is partially disposed in a rocker arm bracket mounted below the cam shaft. The bracket includes a central slot including sidewalls for receiving a portion of the rocker arm. The central slot and the enclosed portion of the rocker arm form an oil-receiving cavity for accumulating oil in the area of the cam pad. This cavity includes crevices so that the accumulated oil can leak out at a controlled rate by means of gravity. This leaking oil in turn flows into the respective valve associated with the rocker arm. The valve train may be disposed at a downward angle with reference to the combustion chamber to which it is coupled, thus allowing the lubricating oil in the valve to flow away from the combustion chamber, thus inhibiting the leakage of oil into the chamber.

BRIEF DESCRIPTION OF THE DRAWINGS

FIGS. 7–9 depict progressions of the combustion process through various stages;

FIG. 10 is a representation of the path taken by flame fronts as they exit the combustion chamber;

FIG. 19 is an isolated view of the valve train according to an embodiment of the invention;

FIG. 20 is an exploded view of the valve train of FIG. 19;

DETAILED DESCRIPTION OF THE PREFERRED EMBODIMENTS

Figure 1:
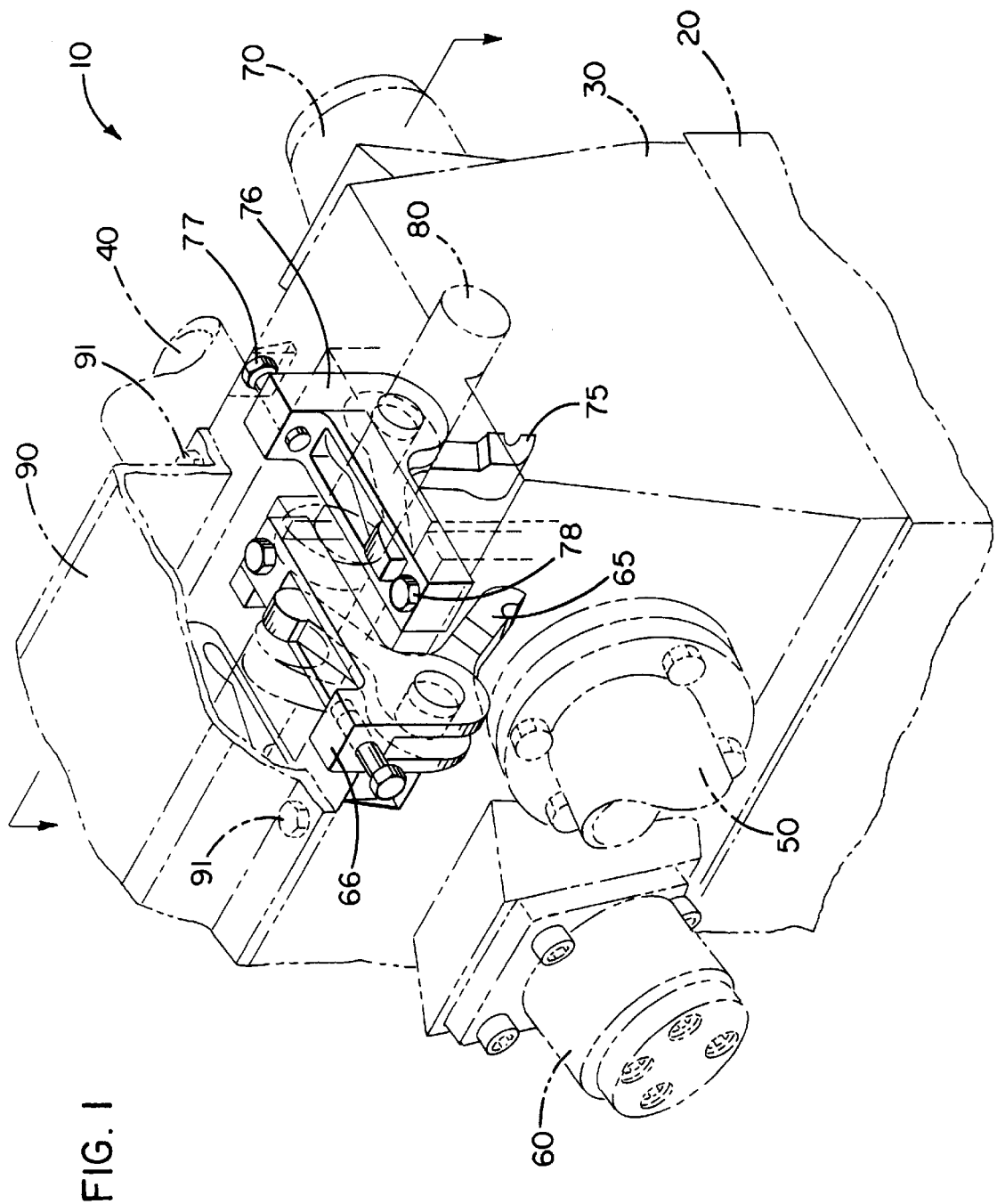
FIG. 1 is a perspective, partially cut-away view of the engine according to the invention.

Turning now to the drawings, FIG. 1 is a perspective view of an automotive engine according to one embodiment of the invention. The engine 10 includes a block 20, above which is disposed a cylinder head 30. Cylinder head 30 is roughly trapezoidal in cross section, having a wider base and narrower top. As the engine 10 is of a valve-in-head design, the cylinder head includes an intake port 40, and an exhaust port 50. According to a novel aspect of the invention, the cylinder head also includes side-mounted valve enclosures 60 and 70, which house valve assemblies. It will be noted from FIG. 1 that the valve enclosures 60 and 70 are mounted to the sidewall of the cylinder head at a depending angle. This mounting angle, and the resulting angled position of the enclosed valves form an aspect of the present invention. The valves contained within valve enclosures 60 and 70 are actuated by rocker arms driven by a cam shaft. The rocker arms are shown in FIG. 1, and bear reference numbers 65 and 75. The cam shaft is shown at 80. As is apparent in FIG. 1, the rocker arms 65 and 75 are disposed within rocker arm brackets 66 and 76. FIG. 1 also shows a head cover 90 which may be bolted in place over the head by means of bolts 91.

Figure 2:
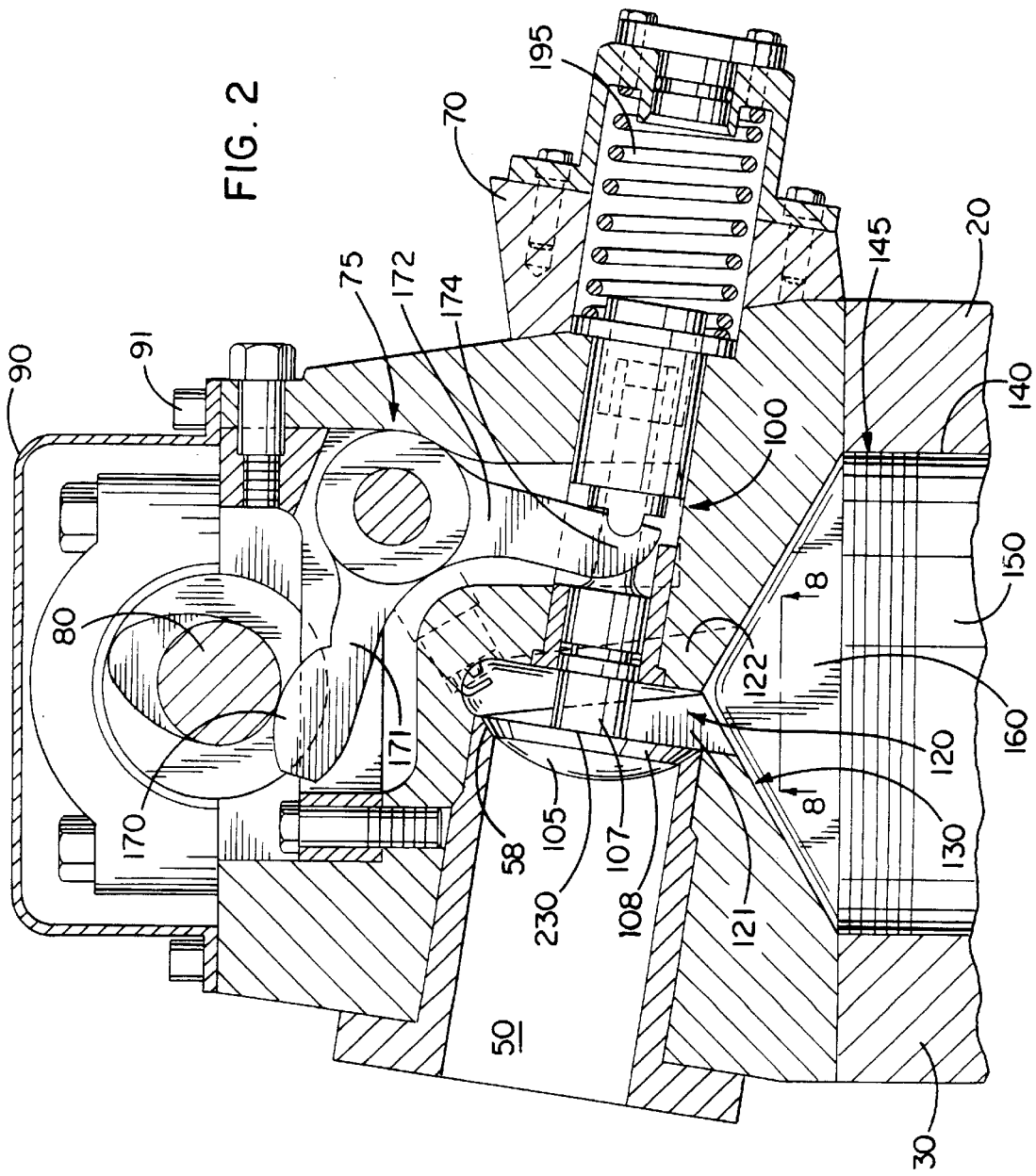
FIG. 2 is a sectional view of the engine according to the invention.

The sectional view of FIG. 2 shows the various components of the engine 10 in greater detail. In particular, FIG. 2 shows the valve structure 100 according to an aspect of the invention. As discussed in regard to the valve enclosure 70, valve 100 is preferably disposed at an upward angle within the cylinder head 30 in this embodiment of the invention. Valve 100 is essentially a poppet valve with a head 105, a stem 107 and an angular sealing region 108 on the head 105. Sealing region 108 is designed to engage on a seat 58 in the exhaust port 50. Valve seat 58 is formed in a sidewall of an upstanding combustion chamber, depicted generally in FIG. 2 by reference numeral 120. As will be appreciated by one skilled in the art, both exhaust valve 100 and an associated intake valve are associated with the combustion chamber 120. The valves are timed by means of the cam shaft 80 so that both valves are closed during the compression and power strokes, and so that the exhaust valve is open during the exhaust stroke, and that the intake valve is open during the intake stroke. Unlike a conventional engine, the neck of valve 100, and the neck of the associated intake valve extend across the combustion chamber to close the exhaust and intake ports respectively. As such, with the valve 100 closed, the valve neck 107 extends across the combustion chamber. As will be appreciated by those skilled in the art, valves are typically disposed within the ports which they seal. Accordingly, gases moving through those ports are impeded by the valves and, particularly in the case of the exhaust ports, unduly heat the valves. According to the present design, this does not occur. As seen in the exhaust stroke represented in FIG. 4, the valve 100 in no way impedes flow through the exhaust port and conduit. Moreover, a typical intake valve—in the intake conduit—is acted upon by vacuum almost constantly. In this design, the valve is only subjected to vacuum during the intake stroke, thus reducing the chance of vacuum leaks.

Figure 5:
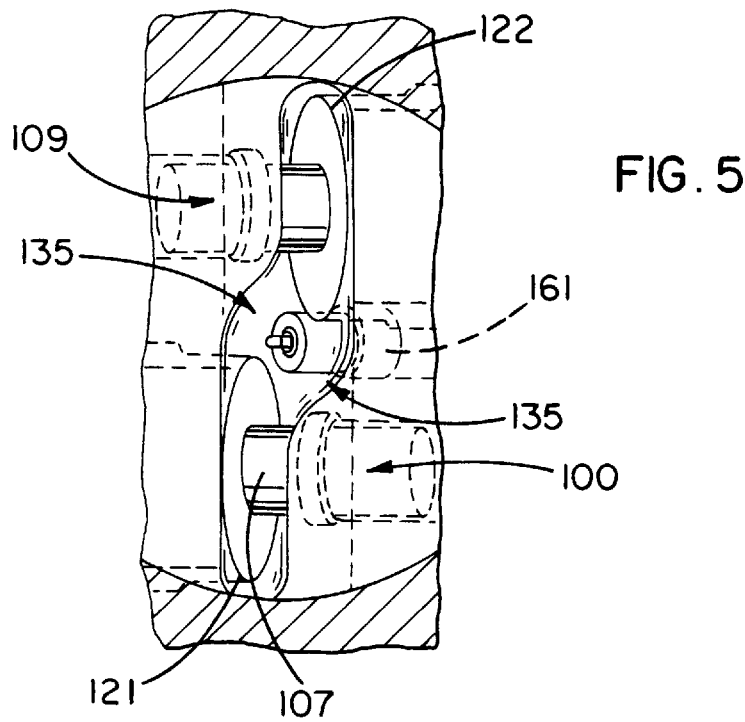
FIG. 5 is an internal view of the combustion chamber according to one embodiment of the invention, shown from below.

It will also be noted from FIG. 2 that the combustion chamber itself has a unique configuration. First of all, the combustion chamber 120 is relatively thin and upstanding. Moreover, the combustion chamber 120 according to the invention is divided into two halves or adjacent sections. The two adjacent sections are 121, shown in solid FIG. 2, and 122, shown in phantom in FIG. 2. They are offset or canted with respect to each other about a vertical or longitudinal axis. A further view of the two sections 121 and 122 can be seen in the bottom section view of FIG. 5. Just as the two adjacent sections of the combustion chamber are angled with respect to each other, so are each paired set of intake and exhaust valves associated with a given combustion chamber. As can be seen most clearly in FIG. 3, the exhaust valve 100 is tilted downwardly in one direction while the intake valve 109 is tilted downwardly in the opposite direction. Since the sections of the combustion chamber with which each valve are associated are also tilted, this tilting of the valves allows the longitudinal axis of the valve to be disposed perpendicularly to the port which is it designed to close.

Figure 6:
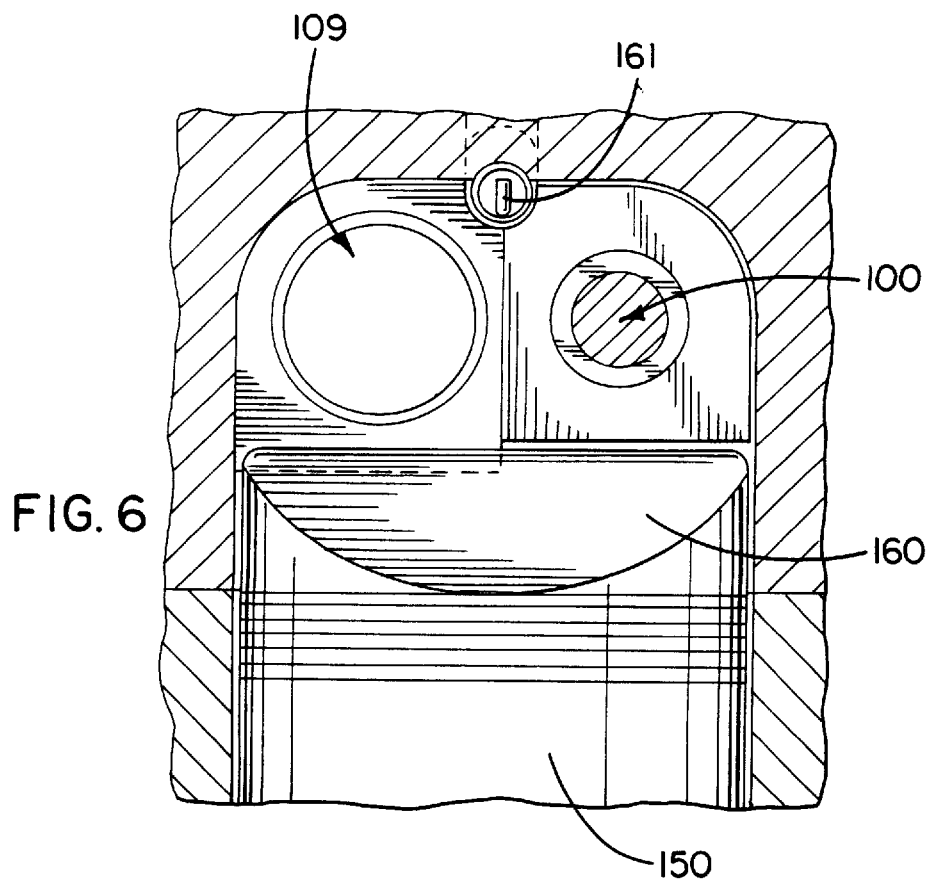
FIG. 6 is a section view of the combustion chamber according to an embodiment of the invention, which also shows the piston head.

Returning to FIG. 2, there is also shown, according to the invention, a piston 150. The piston 150 reciprocates within a cylinder within the block 20. The crown of piston 150, bearing reference numeral 160, is tapered. According to the invention, the crown 160 tapers toward a zenith coincident with a vertical or longitudinal axis of the piston 150. In the present embodiment, this tapering of crown 160 results in a wedge shape, although other tapering shapes may be used. The wedge-shape of the crown 160, according to this embodiment, can be seen by comparing FIG. 2, showing one side view and FIG. 6, showing the other side view.

Cylinder head 30 also includes an interior surface 130 which is adjacent to the compression end of the cylinder, and has a shape that is complemental to the wedge-shape of the piston crown 160. Thus, with the piston 150 at the top of its stroke, the wedge-shaped crown 160 and the complemental interior surface 130 are disposed adjacent to each other, as seen in FIG. 2. Furthermore, the interior surface is in communication with the thin upstanding combustion chamber through a throat 135, the contour of which can be seen most clearly in the section view of FIG. 5.

COMBUSTION

The configuration of the thin upstanding combustion chamber 120, the valve stems which extend across it in the closed position, and the configuration of the piston crown 160 and the complemental surface in the head, all combine to give the engine 10 improved performance and significant advantages in terms of emissions.

One advantage of this design is that the configuration of these components causes a controlled swirl of the charge during the compression stroke. In reference to FIG. 3, the flow of the fuel-air mixture into the combustion chamber 120 is represented. As the piston 190 nears the top of its stroke, the fuel-air mixture is forced or "squished" between the wedge-shaped piston crown 160 and the complementally shaped interior surface 130. The charge is then forced upwardly through the throat region 135 between the combustion chamber 120 and the interior surface 130. The compressed charge is thus channeled into the combustion chamber. As the charge enters the two adjacent sections 121, 122 of the combustion chamber it is forced generally upwardly parallel to the axis of the respective adjacent sections. As the charge rises, it encounters the necks of the exhaust and intake valves, which are extended across the respective chamber in their closed position as seen most clearly in FIG. 5. The valve necks thus serve as sources of intentionally induced swirling in the combustion chamber during the compression stroke and thus induce desirable turbulence in the combustion chamber. In particular, a swirling action of the compressed charge is induced in the charge as it attempts to circulate around the round valve stems, and as it comes in contact with the sidewalls of the combustion chamber, etc. This induced swirl of the compressed charge insures a more homogeneous mixture of fuel and air in the charge. The homogeneous nature of the charge helps to ensure upon ignition, a more homogenous, smooth and even burning of the charge.

Figure 14:
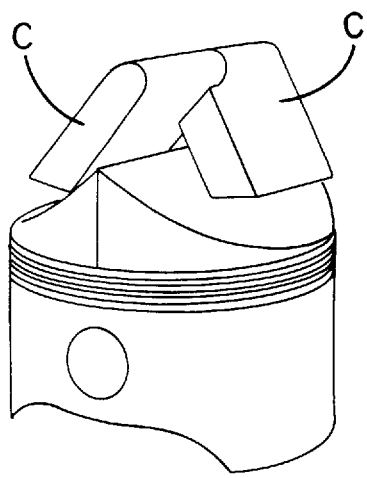
FIG. 14 is a representation of the relative orientation between the combustion chamber and the piston crown.
Figure 12:
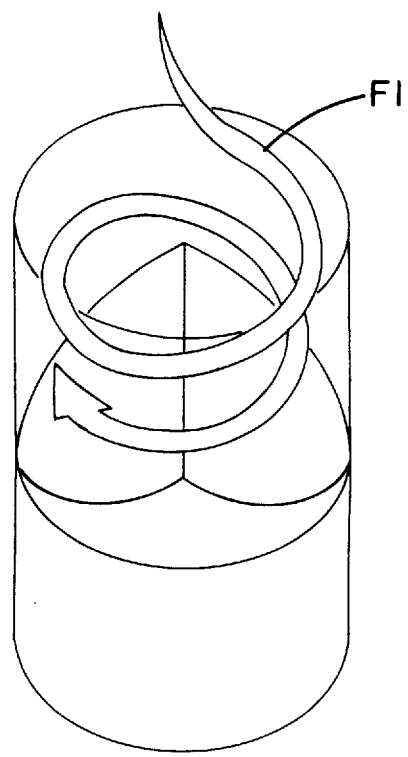
FIG. 12 is a further representation of continued swirling of the charge during combustion.

The configuration of the combustion chamber, valve stems, piston head and cylinder head surface also effect positive action in the combustion chamber during the combustion cycle of the power stroke. Once the charge, which is under turbulence as discussed above, is fully compressed (i.e. the piston is at the top of the compression stroke) the spark plug 160 ignites the charge. As can be seen from both FIGS. 3 and 5, the spark plug, in this embodiment, is located along the horizontal line joining the tops of the two adjacent sections of the combustion chamber, and is also centrally located between the two chambers in a transverse direction. That is, the spark plug is centered at the top of the combustion chamber 120. As the charge ignites, the expanding flame front interacts with the valve stems extending across the adjacent sections 121, 122 of the combustion chamber. A series of theoretical drawings showing the progression of the combustion process according to the invention is shown in FIGS. 7–13. The interaction of the flame front F with the valve necks V (FIG. 7) forces the flame front to circulate around the necks V, thus inducing a swirling in the advancing flame front. Further, the flame front is effectively divided into three separate paths (labeled P1, P2 and P3 in FIG. 8). As the three flame fronts progress, they create a whirl path by pushing the unburned gases in front of them. The center front, following path P2, is not ready to collide and join with the fronts in paths P1 and P3 (see FIG. 9). At the same time, the flame fronts in paths P1 and P3 are in contact with the combustion chamber sections (C in FIG. 8) themselves, which are angled with respect to each other as previously discussed (an isolated view of the combustion chamber and piston of the invention is shown in FIG. 14). The separation and angling of the adjacent sections of the combustion chamber serves to divide the emerging flame front into two sections, each one directed along an adjacent section of the combustion chamber. The two halves of the flame front, however, do not remain separated. Rather, because of the configuration of the combustion chamber and the piston crown, they react and push on each other to induce a further complex swirling of the expanding flame front that includes a horizontal component.

Figure 3:
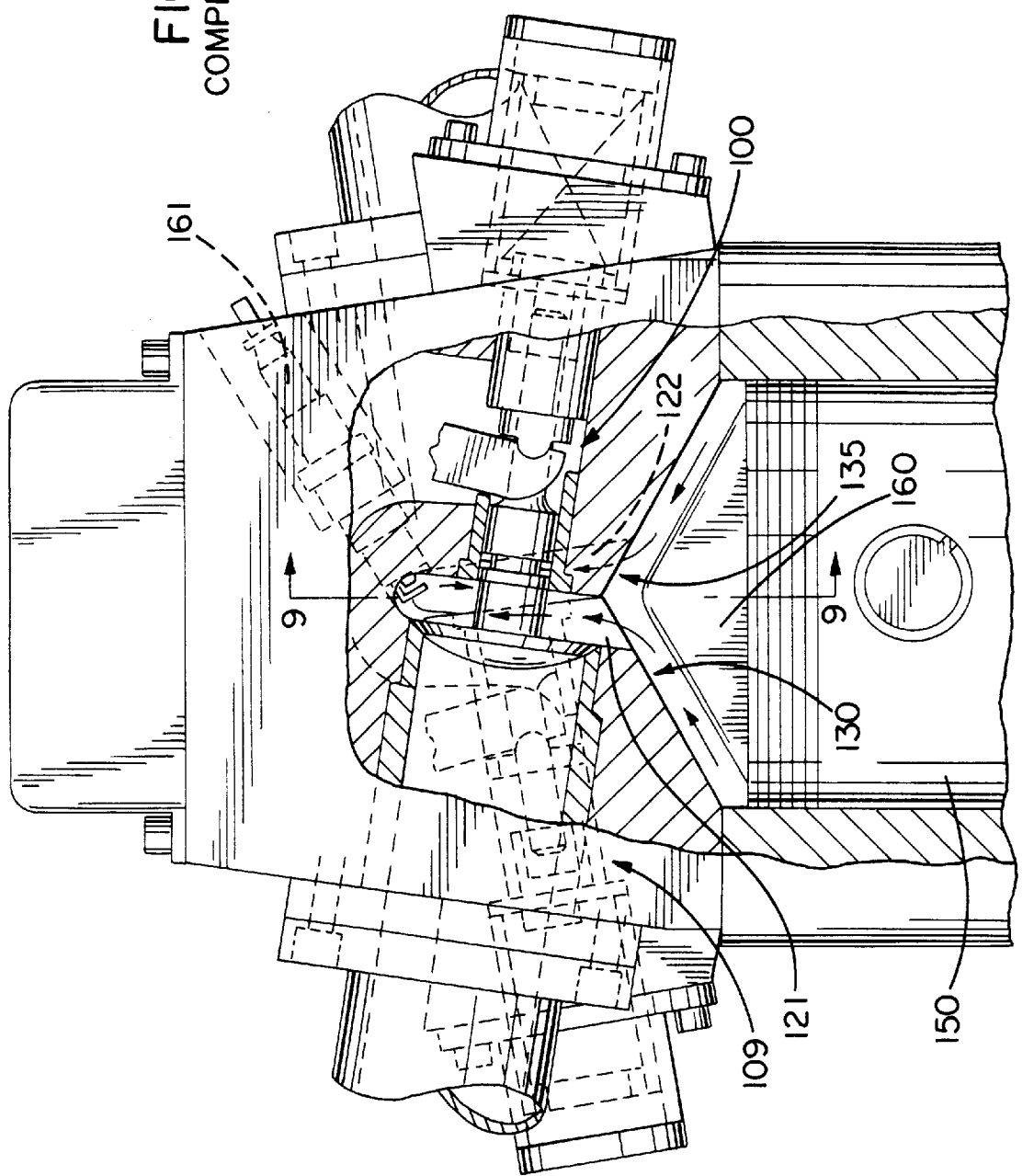
FIG. 3 is a further sectional view, showing the engine according to the invention during the compression stroke.
Figure 11:
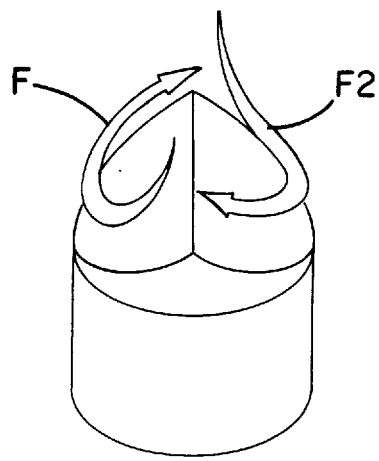
FIG. 11 is a representation of the swirling action induced in the flame front by the piston crown.

It is believed that the interaction of the separated flame fronts to induce this horizontal component to the swirl initially occurs adjacent the throat area 135 between combustion chambers 120 and internal surface 130 (see FIG. 3). During the time the expansion of the flame front and swirling are occurring in the combustion chamber (described above), the increased pressure in front of the flame front is forcing the piston downward. As the wedge-shaped crown 160 of the piston 150 and the piston itself withdraw into the cylinder, the two halves of the flame front (one from each combustion chamber section) exit from the throat region 135 into the compression end of the cylinder. The divided and swirling flame front (indicated in FIG. 10 by references F1 and F2) then encounters the wedge-shaped crown 160 of the piston as depicted in FIG. 10. Indeed, the adjacent sections 121, 122 of the combustion chamber are angled so as to aim the separated flame fronts toward and respective faces of the crown 160 of the present embodiment (See FIG. 14). Because of the wedge-shape, the expanding flame front is again thrown outward toward the walls of the interior surface 130, and also toward the walls of the cylinder. The flame fronts thus assume a rotational motion having a significant horizontal as well as vertical component. This rotational motion is caused by the gases being thrown out to the cylinder sidewalls, and by the interaction of the gases with the piston head as shown in FIG. 11.

Figure 13:
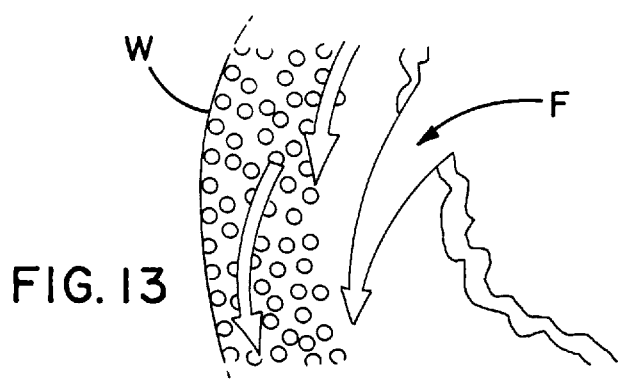
FIG. 13 is a representation of scrubbing of clinging fuel from the walls of the combustion chamber according to the invention.

The swirling motion continues, having both a vertical and horizontal component, as the piston withdraws further into the cylinder. Because of inertia and the directing of the flame fronts according to the invention, each flame front which emerges from a combustion chamber section will follow a path like the exemplary one for flame front F1 shown in FIG. 12. This significant swirling and directing of the flame front during combustion not only assists in maintaining a slow, even burn of the charge, but also leads to reduced emissions by virtue of a "scrubbing" action on the unburned hydrocarbons which typically stick to the inner cylinder walls. The scrubbing action according to the invention is shown in FIG. 13. The swirling flame front F is subject to centrifugal loading, as indicated by the solid arrows. As the front F is pushed toward the cylinder wall W. it imparts sufficient energy to the molecules clinging to that surface to allow those molecules to liberate from the walls and be swept into the continuing combustion.

To summarize, a multiple flame front is initially created in the combustion chamber by means of the valve necks dividing the initial flame front and inducing a largely vertical swirl therein. As the same time, the angling of the two halves of the combustion chamber also serves to divide the flame front into two directed halves. These halves exit the combustion chamber and engage the tapered crown of the piston and are thrown out, to the walls of the cylinder thereby creating a horizontal component to the swirling, advancing flame front. The outward, rotational movement of the flame front also provides a scrubbing action to the cylindrical walls. A significant aspect of this combustion process is that the various swirling actions actually result from the expansion of the flame front itself, as guided and directed by the geometry of the combustion chamber according to the invention. In a conventional engine, the combustion initiates and accelerates the gases. In the present invention, the components are designed to also give the gas desirable direction and swirling to achieve enhanced performance and emissions levels.

It will be appreciated by one skilled in the art that the foregoing description of the combustion process represents an oversimplification. The variables affecting this process are too long to list. However, it is clear that the design of the combustion chamber, the valves, the piston head and the cylinder head are such that the vertical and horizontal components of the induced swirl referred to above will occur in the combusting charge. Indeed, close inspection of a prototype engine according to an embodiment of this invention exhibited swirl shaped burn marks on the crown of the piston, confirming the existence of swirling of the charge during combustion. Moreover, the existence of such a mechanism for increasing the thoroughness of the combustion is evident from the improved emission characteristics observed for an engine according to an embodiment of the present invention.

Figure 15:
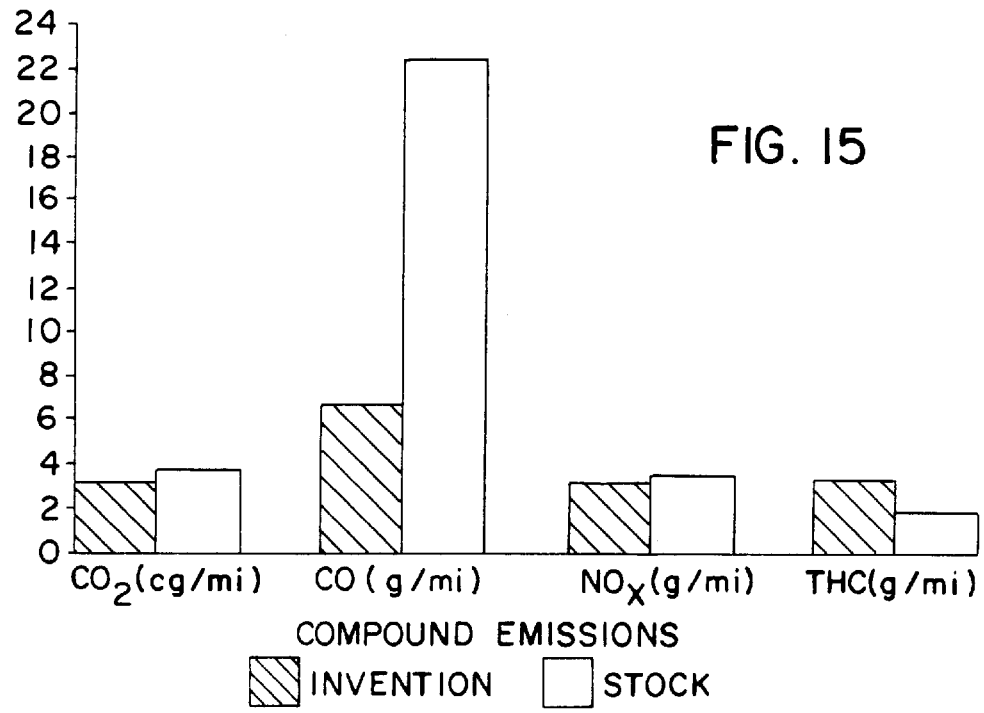
FIG. 15 is a graph showing the comparative emission between an engine according to the invention and a stock engine.

A graphical representation of those improved characteristics as compared to the same characteristics for stock automotive engine is shown in FIG. 15. As can be seen from that figure, the engine 10, according to the invention, shows improved emissions characteristics for $CO_2$; CO; and $NO_X$. The graph also shows a poorer emission result in terms of unburned hydrocarbons (THC). It is believed that the superior CO and $CO_2$ emissions are a result of the swirling actions induced in the combustion chamber and the compression end of the cylinder as discussed above. The more thorough burning due to increased homogeneity of the charge and due to the scrubbing action of unburned charge from the walls contributes to this improvement. Although the actual emission levels for THC were higher in the engine according to the invention, the level still indicates an improvement over the stock engine. This is due to the fact that the present engine has a much larger surface-to-volume ratio (S/V) than a stock engine. Typically, a large S/V leads to a significant increase in THC—due mainly to the large surface area being generally cooler and reducing the combustion temperature. In the present engine, the S/V is around 3–4 times larger than the stock engine, but the THC emissions are comparable. This is an indication that the unique combustion properties of this engine greatly enhance the level of hydrocarbon burning during combustion—most probably due to the swirling of the charge sustaining the burn, and due to the scrubbing action of the swirling charge. Moreover, the prototype engine according to this embodiment exhibited superior mileage to the stock engine: 27.2 as opposed to 22:2 mpg. A modified stock engine was used to generate the "stock" data shown in FIG. 10. That engine was a Ford 2.3 liter SOHC 4-cylinder engine. The engine had a 9.5:1 compression ratio. The engine was operated with a Holley two barrel carburetor and Mallory after market points ignition. Standard Ford intake and exhaust manifolds were used, but the electronic ignition and fuel injection were deleted to make the stock engine and the engine according to the invention identical except for the cylinder heads.

Figure 16:
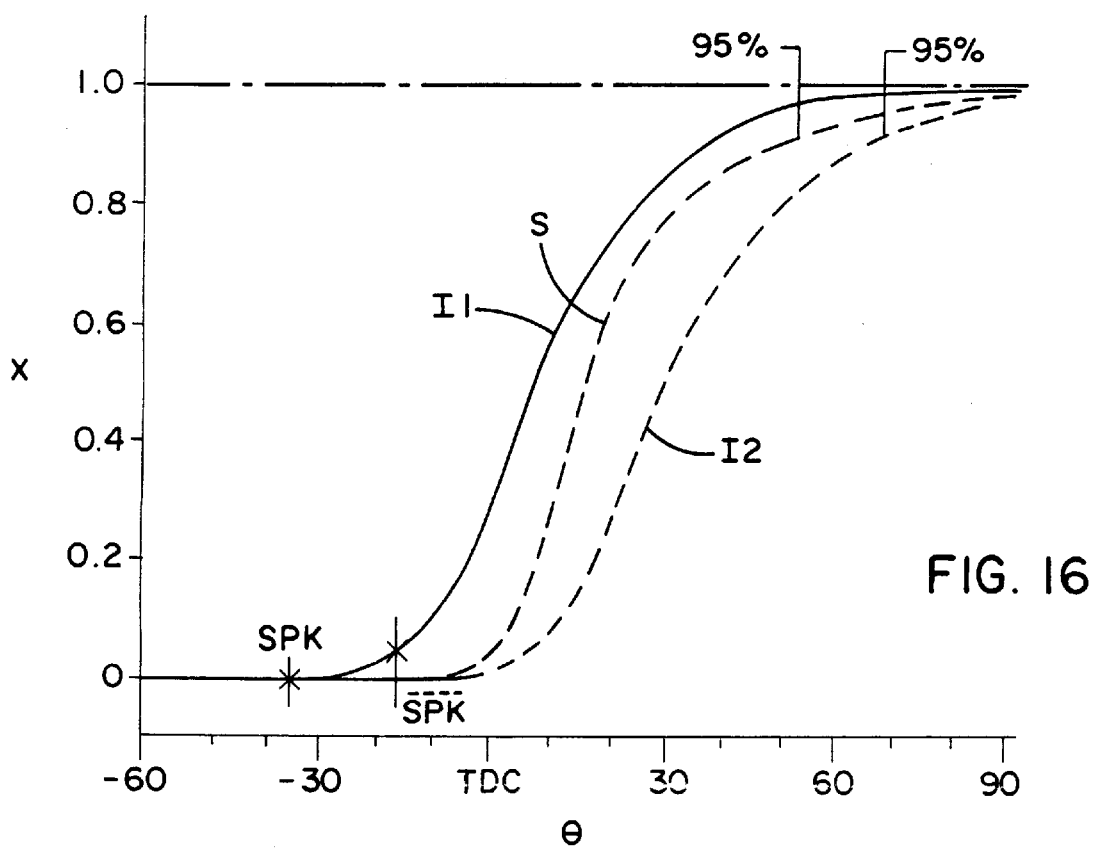
FIG. 16 is a graph showing the percent of consumed charge (X) as a function of the crank angle (Θ) of the crank shaft for the inventive and stock engines.

It is also believed that the configuration of the combustion-related components leads to a smoother, even burn during combustion than in conventional engines. The smoothness of the burn, as compared to that of a stock engine, can be seen in FIG. 16. That plot shows the percent of consumed charge (X) as a function of the crank angle (Θ) of the crankshaft and was generated with the two engines running at 3800 RPM and 99% load. As will be appreciated by one skilled in the art, the shape of such curves will differ for different RPM and load conditions. The central curve (S) is the fuel consumption curve for the stock engine. The left dashed curve I1 is the actual fuel consumption curve of an engine according to the invention, and the second dashed curve I2 is the same as I1, but displaced in time so that the spark ignition time of I2 coincides with that of S. As this graph shows, the burn of the stock engine has a very steep slope, indicating that most of the combustion occurs over a small range of crank angles. Curve I2, however, shows a smoother, less steep curve, showing that the combustion in the inventive engine is more gradual and constant. It is believed that a primary cause of this smoother burn is the configuration of the combustion chamber and cylinder. While the combusting charge is in the combustion chamber, it is somewhat restricted by the small size of the chamber, and the presence of the valve necks. Upon exiting into the compression end of the cylinder, the flame front is less restricted and is subject to the swirling and scrubbing action discussed previously. These different phases of combustion apparently lead to the smoother burn characteristics shown in FIG. 16. Such a burn may also be referred to as a "long" burn, since more constant pressure is exerted on the piston over a longer portion of its travel, as compared to the burn of a conventional engine.

Figure 17:
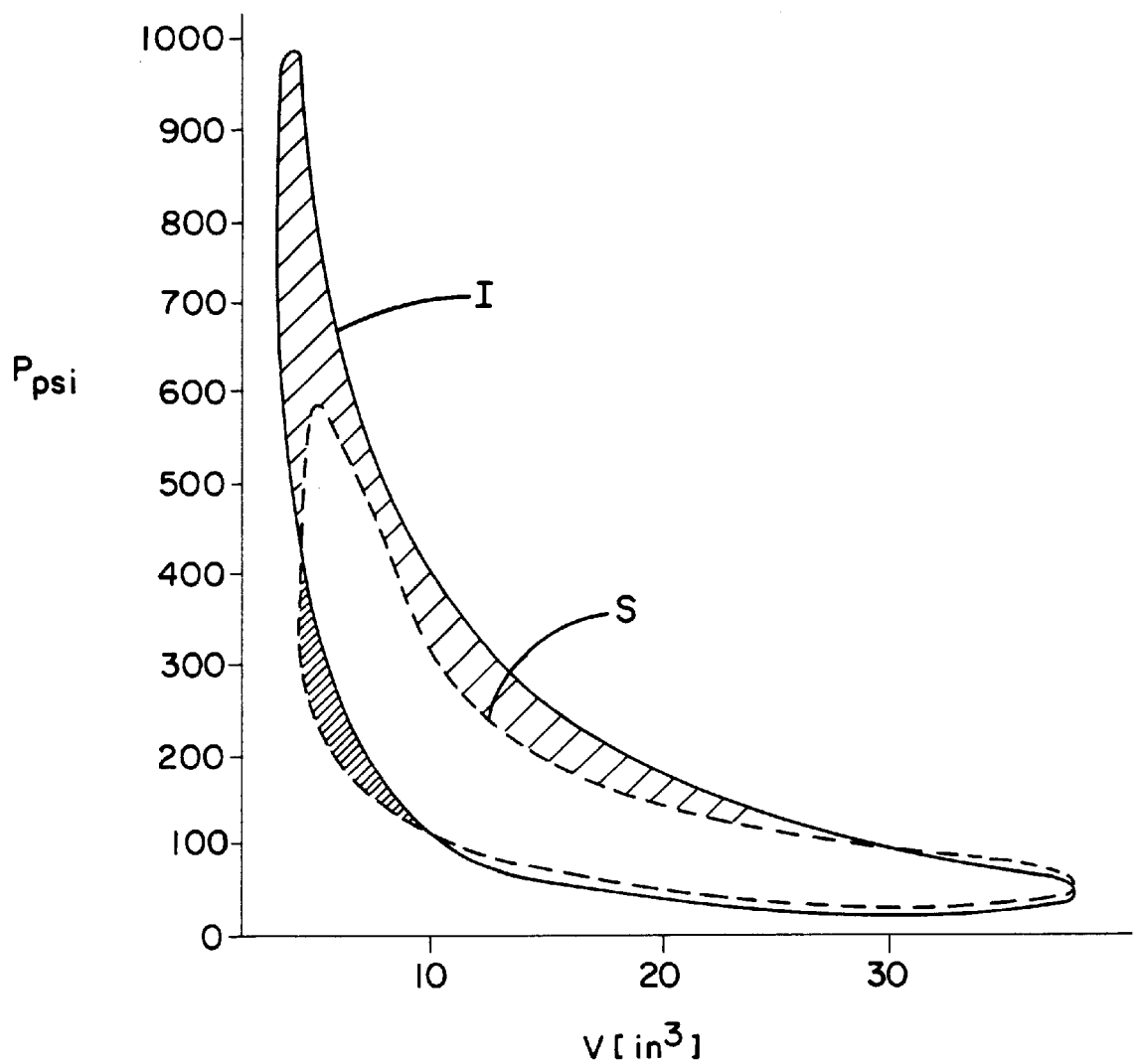
FIG. 17 is a graph of the pressure volume curves comparing the inventive and stock engines.

The smoother burn characteristics also mean that the pressure applied to the piston face in the engine according to the invention is more uniform. A pressure-volume curve comparing the stock engine and the inventive engine is shown is FIG. 17. This curve was generated with the two engines running at 3800 RPM and 99% load. As will be apparent to one of skill in the art, the shape of these curves will differ for different RPM and loading conditions. As can be seen, the curve for the inventive engine I is broader than that of the stock engine S. This is firstly an indication of the more even burning of the engine according to the invention.—i.e. more pressure is applied during a longer period of the combustion stroke. Further, the area under this curve represents the gross indicated work per cylinder—which is also higher in the engine according to the invention. The more even application of pressure the piston surface also introduces less undesirable vibration into the combustion process.

The smooth burn according to the invention also leads to reduced $NO_X$ emissions. As will be appreciated by one skilled in the art, the higher the peak temperature, the greater the possibility of $NO_X$ production. By maintaining the lesser peak temperature of combustion in the present engine, the $NO_X$ emissions are reduced as shown in FIG. 15. The configuration of this engine maintains this lower peak temperature, while still exhibiting THC emission valves comparable to the stock engines. Typically, however, this reduced peak temperature would lead to higher THC because lower temperature means a less efficient burn. The unique characteristics of the present combustion apparently leads to both lower peak temperature and complete burning of the charge. This may be due to the burn occurring over a longer period of the piston's stroke than a conventional engine, such that the potential exists for more crevice volume to be exposed to combustion, and to thus burn as well. This effect is further-enhanced by the scrubbing action, described previously.

VALVE LUBRICATION AND COOLING

The engine 10, according to the invention is also designed for improved valve lubrication, cooling and ease of servicing and adjustment. As discussed in regard to FIG. 1, the engine 10 includes L-shaped rocker arms 65 and 75, which are housed within generally P-shaped rocker arm brackets 66 and 76. Each rocker arm bracket is held in place by two bolts one disposed horizontally 77, and one disposed vertically 78. Assuming head cover 90 is removed, rocker arm bracket 76 and its associated rocker arm 75 can be easily removed by removing bolt 77 and 78 and simply lifting the bracket and arm out of the cylinder head. This makes the bracket and rocker arm easy to service.

The operation of a representative rocker arm 75 can be seen most clearly in reference to FIG. 2. The L-shaped arm 75 includes a cam pad 170 disposed at the end of arm 171. Unlike a conventional single overhead cam configuration, it should be noted that the cam pad 170 is disposed below the cam shaft 80. This leads to advantageous lubrication and functional features as will be described in greater detail below. The depending arm 172 of the bracket 75 engages the valve train of valve 100 at an actuating end 174. As the rocker arm in FIG. 2 is pivoted in the counter-clockwise sense by virtue of the cam shaft 80 rotating in a clockwise sense, the valve 100 is disengaged from the exhaust port 105 by the actuating end 174 pushing the valve train to the right in the sense of FIG. 2. A valve spring 195 biases valve 100 toward the closed position.

Figure 4:
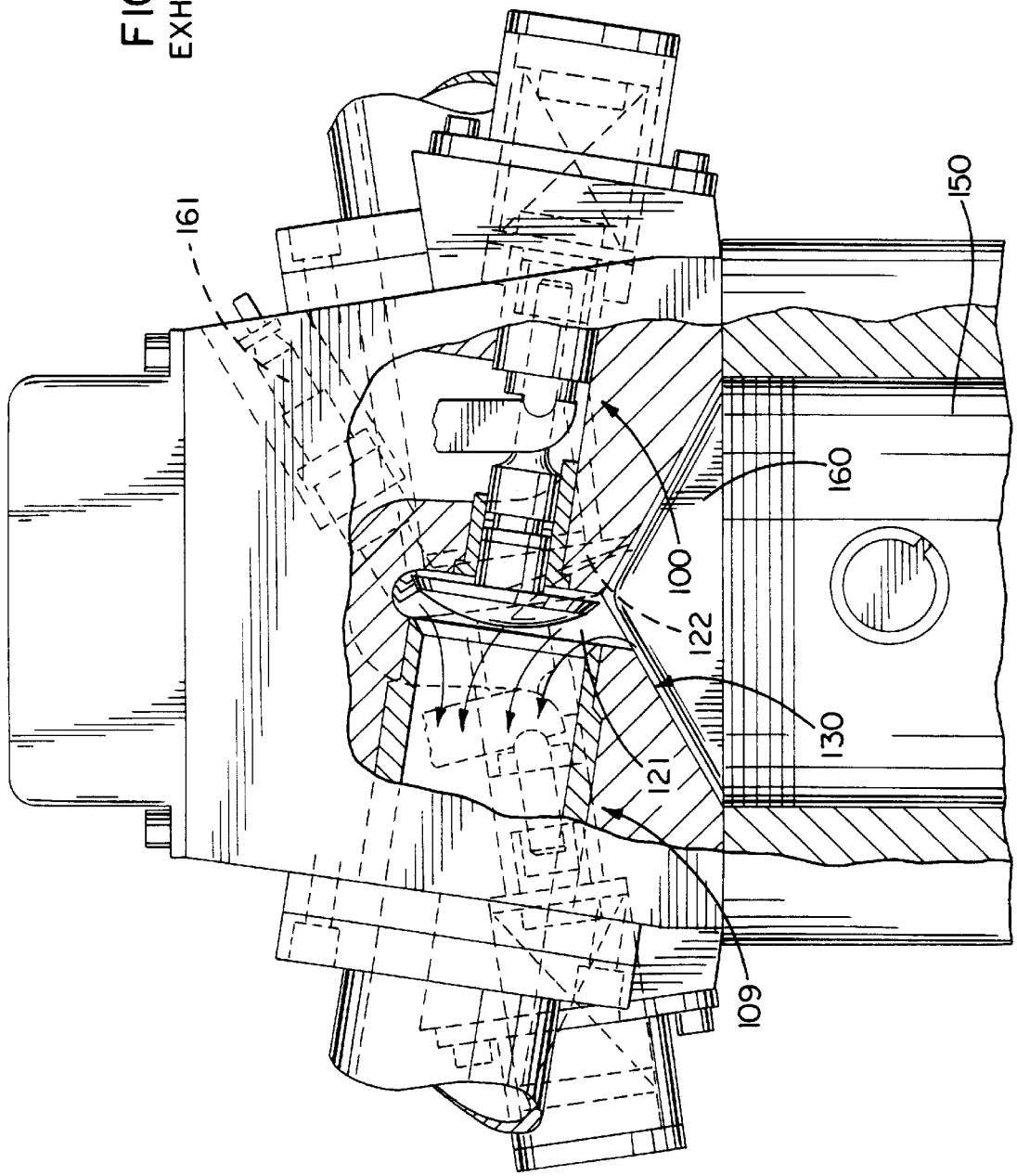
FIG. 4 is a similar view to FIG. 3, but showing the engine according to the invention during the exhaust stroke.

An isolated perspective view of the rocker arm 75 and valve 100 are shown in FIG. 19, and an exploded view is shown in FIG. 20. The actuating end 174 of the rocker arm 75 engages a valve shoe 200 which is entrained on stem 107. The valve shoe 200 is disposed on the valve stem 107 between a valve guide 205 and a rear bearing sleeve 210. Head 105 is disposed at the end of stem 107. As can be seen in FIGS. 3 and 4, the valve guide is stationary in the cylinder head, while the stem 107 reciprocates with respect to the guide 205. As can be seen most clearly in FIG. 19, the valve guide 205 includes a curved bearing surface for receiving the curved actuating end 174 of the rocker arm 75. Valve guide 205 includes the curved bearing surface for two reasons. First of all, it allows the guide to adequately support the rocker arm 75. Secondly, the extended bottom section of the guide serves as a reservoir for lubricating oil, insuring adequate lubrication between arm 75 and guide 205. The threaded end at stem 107 is fed through the central hole in valve shoe 200 and rear sleeve 210. Threaded bolt 220 fits within the central hole of rear sleeve 210, and is interior threaded to receive the threads of stem 107. A compression-type oil ring 230 is also disposed on the shaft 107. As will be appreciated by one skilled in the art, the oil ring is disposed on the stem to prevent leakage of oil out of the valve and into the combustion chamber. The various components of valve 100 are designed and made to be light weight. A stock spring 195 may be used to achieve necessary valve actuation.

Figure 21:
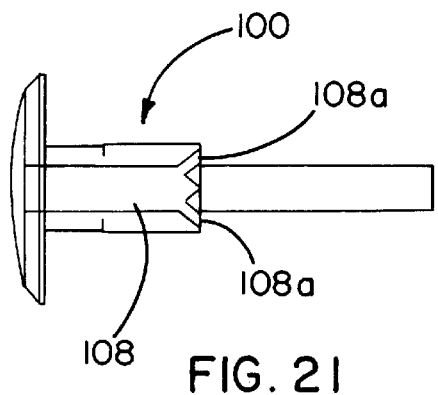
FIG. 21 is a section view of a valve according to an embodiment of the invention.

The valve according to this embodiment also includes numerous features leading to improved valve cooling. The stem 107 has a thicker region 107a, which tapers to a thinner region 107b. The presence of the thicker region 107a gives the valve an increased radiating surface leading to better valve cooling. According to a further aspect of the invention, the valve 100 also includes a hollow interior region. A section view of valve 100 is shown is FIG. 21, and shows the hollow region 108. The presence of this region further increases the radiating area available for heat dissipation. Thus, unlike thinner, solid conventional valves, the valves according to the invention have both a larger outside diameter and radiating surface and a large inner radiating surface provided by hollow region 108. Furthermore, despite the fact that conventional valves have a theoretical cooling by virtue of heat flow from the head to the stem, this cooling is largely non-existent. Because of the significant length of conventional valve systems, that cooling mechanism is secondary to the cooling mechanism of heat flow from the valve head to the valve seat. Of course, this primary cooling mechanism is unavailable when the conventional valve is open, i.e. not in contact with the seat. Because of the shorter, thicker stems and the presence of the hollow region allowing both inner and outer radiating areas, the valves of the present invention include improved heat transfer mechanisms. These mechanisms are also always available to the valve, and are not dependent on the valve contacting a valve seat.

Further still, the valve 100 may also include oil ports 108a allowing communication of circulating oil into hollow region 108. The pressurized oil will enter region 108 through the ports 108a and contact the inner surface of the valve in order to carry away heat. The valves also stay cooler since they are shorter than stock valves, and thus have a shorter thermal distance from head to stem. Further, the valves are cooler because, at least in the case of the exhaust valve, the stem is retracted from the exhaust path during exhaust, keeping that valve cooler by preventing exposure of the stem to super hot exhaust gas. The same exhaust stem is then cooled by cold intake charge during the intake stroke. The valves according to the invention are thus light weight and exhibit improved temperature characteristics, leading to less thermal distortion.

Figure 18:
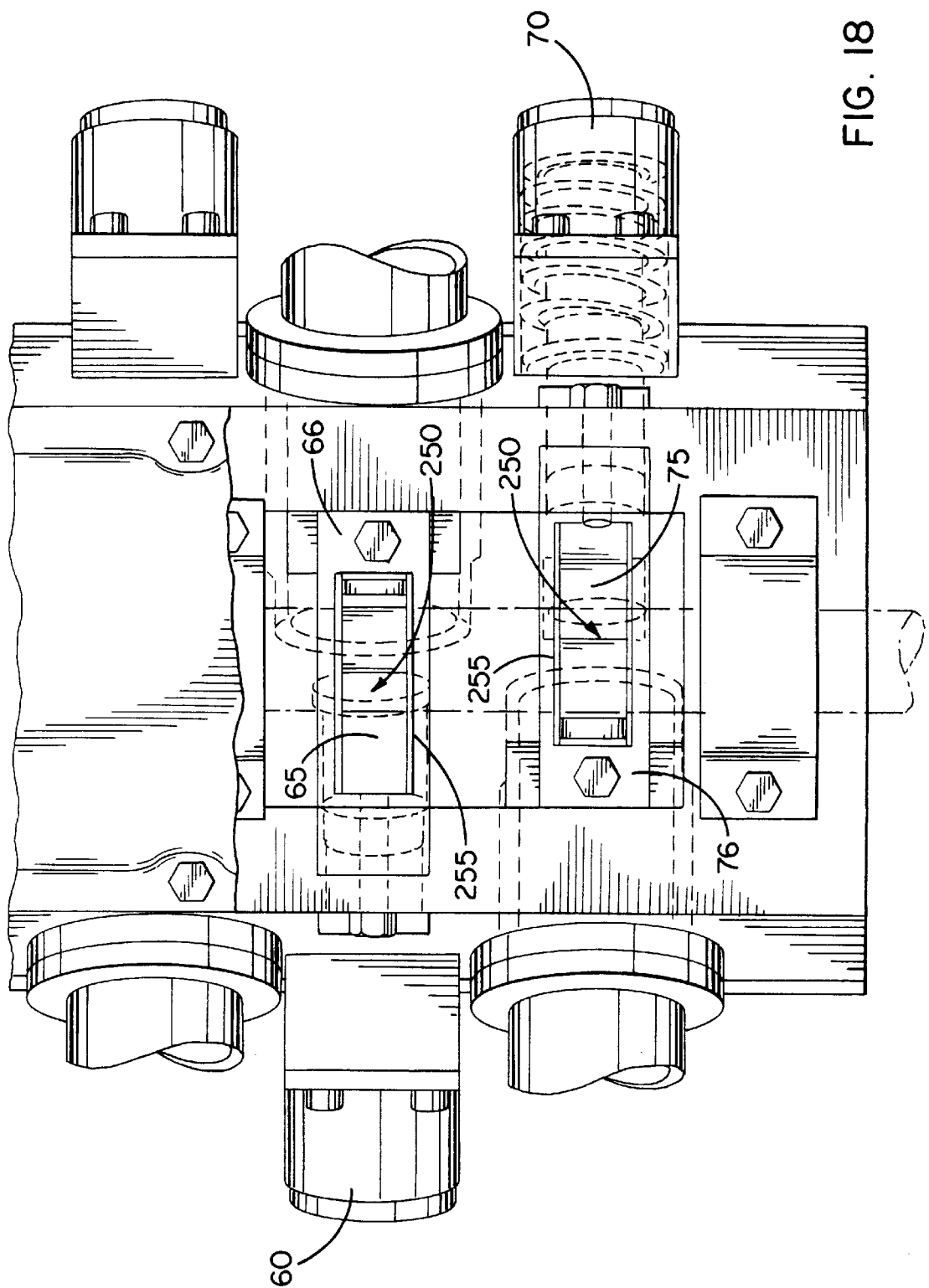
FIG. 18 is a top cut-away view of the head according to one embodiment of the invention.

The configuration of the rocker arm brackets, rocker arms and tilted valves leads to improved lubrication characteristics for this engine. As can be seen in FIG. 1, and the top view of FIG. 18, the rocker arm brackets include elongated central openings 250. These elongated central openings 250 receive the horizontally extending arms of the respective rocker arms. At the same time, the openings serve as oil reservoirs. The upstanding sidewalls of the central openings 250 and the top surface of the rocker arm define a reservoir for collecting oil and maintaining the rocker arm and its associated cam pad under more constant lubrication. On either side of the rocker arms within elongated central openings 250 are leak crevices indicated generally by reference numeral 255 in the top view of FIG. 18. These leak crevices allow lubricating oil to leak along the depending portion of the rocker arms and into the valve train assembly. Thus, lubrication of both the rocker arm and the valve train are assisted by gravity. This is in distinction to the conventional single overhead cam configuration where the cam pads are located above the cam shaft. In that case, oil must be thrown upward to lubricate the cam pad cam shaft surfaces. Of course, gravity works against such a lubrication system. Similarly, this structure represents an improvement over the conventional dual overhead cam arrangement. In such an arrangement the buckets which house the spring end of the valve train are located below their respective cam shafts. However, the dual overhead cam design does not provide for pooling of the lubrication oil as in the present design. Accordingly, run off due to gravity is also present in that design. Further, conventional valves rely on planned leakage of oil to adequately lubricate the valve stem/bearing sleeve interface. This is an imperfect, but workable system. It can lead, however to undesirable results. For example the leakage of oil through an intake valve is enhanced, as compared to that through an exhaust valve, by virtue of the fact that the intake valve must contain vacuum. In the present invention, however, valve lubrication is controlled as opposed to relying on designed-in leakage in the manner of conventional engines. For instance, because the present valves are not sitting in the manifold, the stems behind the compression rings can be bathed in oil—as opposed to receiving minimal, leakage oil as in standard valves. Moreover, the circulation of oil through the present valves not only enhances lubrication, but also serves a cooling function, described above. The present valves are thus both cooler and better lubricated than conventional valves.

Gravity also assists the lubrication system in the present invention by virtue of the fact that the valves may be tilted in a preferred embodiment. Accordingly, lubricating oil in the valve tends to run away from the rings and the combustion chamber. Accordingly, when the engine is shut down lubricating oil that may typically leak into the combustion chamber will be drawn by gravity away from the combustion chamber and into the spring end of the valve train. Of course, prevention of leakage of oil into the combustion chamber increases engine efficiency and also reduces hydrocarbon emissions generated by burning oil as opposed to a fuel-air mixture. Thus, instead of gravity working against the lubrication system as in conventional single and dual overhead cam configurations, the design according to the present invention uses gravity to enhance the lubrication system.

ENHANCEMENTS

While the engine just described has superior performance and emissions characteristics as compared to a stock engine, it is believed that further improvements to the engine would lead to even greater performance and emissions characteristics. As will be appreciated by one skilled in the art, the only meaningful way to analyze an the performance of an engine is to conduct empirical studies on a prototype. While a prototype was built according to the previous embodiment, no prototype, to date, has been built incorporating the following potential improvements. Accordingly, the asserted advantages are at present somewhat theoretical, although soundly based on existing engine design principles and experience gained by testing and analysis of the previous embodiment. Thus, these improvements are also included within the scope of the invention.

A first improved feature could be an increased compression ratio. High compression is important in an engine according to the invention since the engine features a high surface to volume ratio in the combustion chamber. It is believed that a higher compression ratio would result in even lower unburned hydrocarbon emissions. Modification of both a tapered piston crown and the thin upstanding combustion chamber sections will lead to this higher compression ratio.

Figure 22:
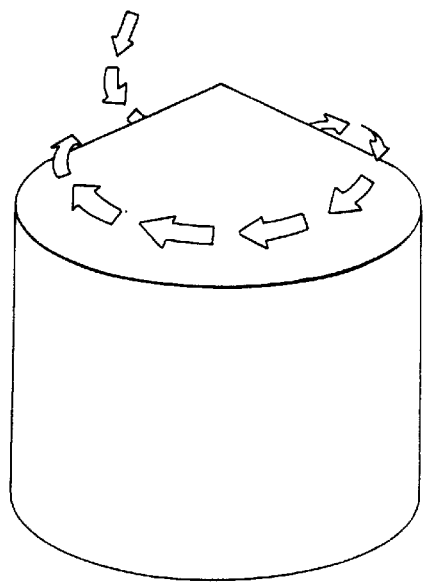
FIG. 22 is a representation of a piston crown according to an alternative embodiment of the invention.

Another possible improved feature of the engine would be reduction of crevice volumes. As is known to those skilled in the art, crevice volumes are small volumes that occur at the proximity or joining of any two entities within the combustion chamber. In the embodiment previously described, an example of such a crevice volume is the joint between the valves and the valves seat, where a significant crevice is formed because of the seating angles. Another crevice volume in the previously-described embodiment is the thin volume between the piston crown and the complemental interior surface of the cylinder head. Crevice volumes create a problem in that they form a very acceptable place for unburned charge to hide, thus preventing the charge from being thoroughly combusted. In the embodiment previously-described, the wedge-shaped piston crown resulted in two very large and isolated crevice volumes between the curved portions joining each crown face and the complementally-shaped surface in the head. These crevice volumes can be seen most clearly in FIG. 2. This problem could be potentially solved by use of a cone-shaped piston, as shown in FIG. 22. This design is consistent with the previous description of the piston crown tapering to a zenith along the central axis of the piston.

Such a design not only would reduce crevice volumes, but would also lead to increased combustion efficiencies. In the previously-described embodiment, it is believed that the wedge-shape of the piston crown may have adversely affected the horizontal component of the complex swirl pattern of the combusting charge. This is due to the fact that the axially extending joint line between the two wedge faces served as a barrier to the swirl which had to be surmounted during each period of circulation. Modification of the piston crown to be cone-shaped would eliminate this problem, while also helping to eliminate the crevice volume problem.

Figure 23:
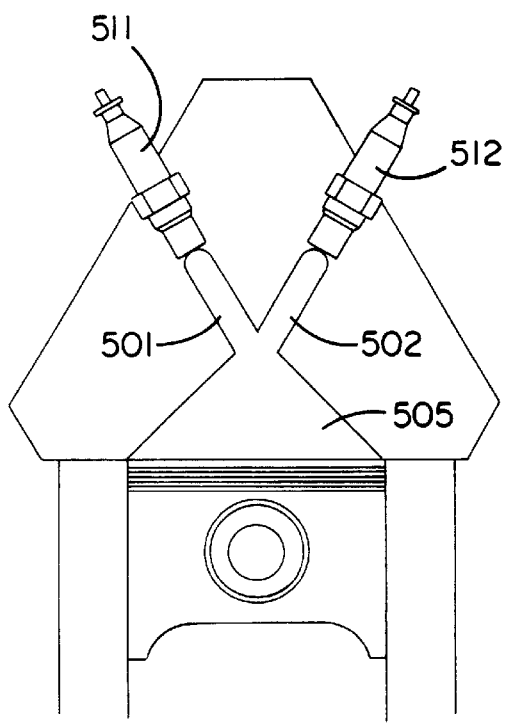
FIG. 23 is a section view of an alternative embodiment of the invention.

Modification of the piston head to a cone shape could further be combined with a modification to the combustion chamber, as shown in FIG. 23. In this design, the two halves, 501 and 502, of the combustion chamber are still offset about a longitudinal axis as in the previous embodiment, but they are joined at the bottom instead of the top. As a result, the two separate flame fronts generated in each half of the combustion chamber will not interact until just before the flame fronts enter the compression end 505 of the cylinder. Of course, such a design requires each chamber half to have its own spark plug 511, 512. It is believed that this design will further enhance the swirling and scrubbing action of the combusting charge. Each chamber will have a valve neck 503 associated therewith (FIG. 24) to serve as a source of swirl for the flame front, and the two halves of the exiting charge will be more accurately directed so as to be thrown out against the cylinder walls with even greater intensity leading overall to a more thorough burn, while maintaining the other advantageous combustion characteristics of the preferred embodiment.

A further potential improved feature in the engine would be a reduced surface to volume ratio. This could be achieved by having a more compact combustion chamber, as well as a reduced surface area at the piston crown. Since less surface area will be available for clinging, unburned hydrocarbons, the lower surface to volume ratio should produce less unburned hydrocarbons.

Figure 24:
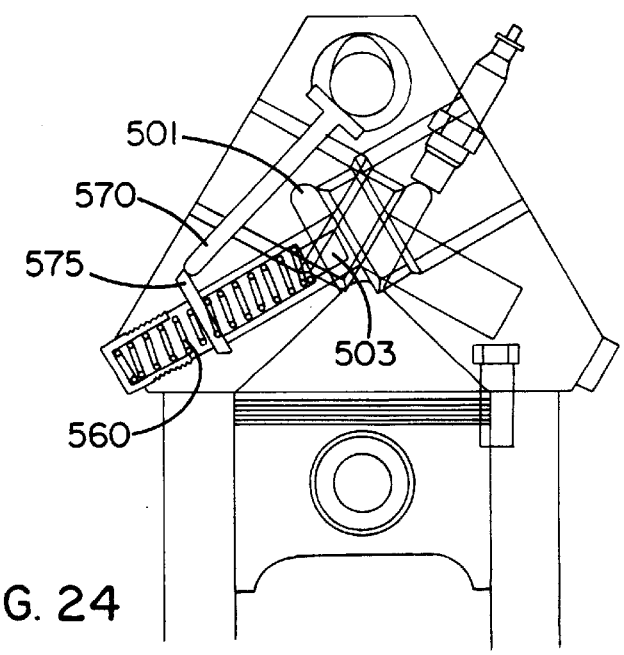
FIG. 24 is a further section of an alternative embodiment of the invention, and showing a valve train in place.
Figure 25:
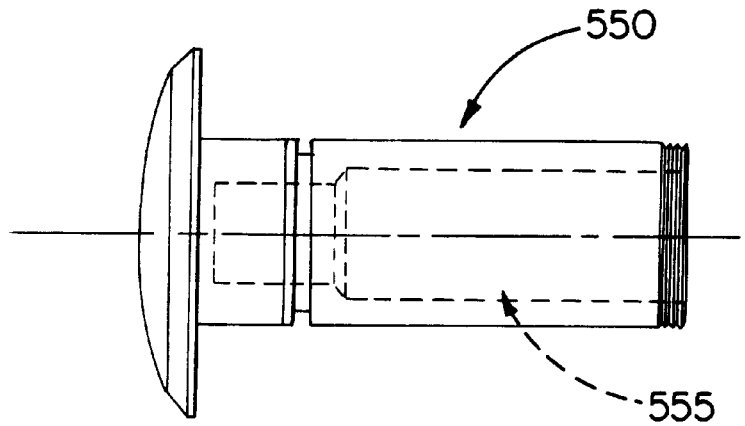
FIG. 25 is a section view of a valve according to an alternative embodiment of the invention.
Figure 26:
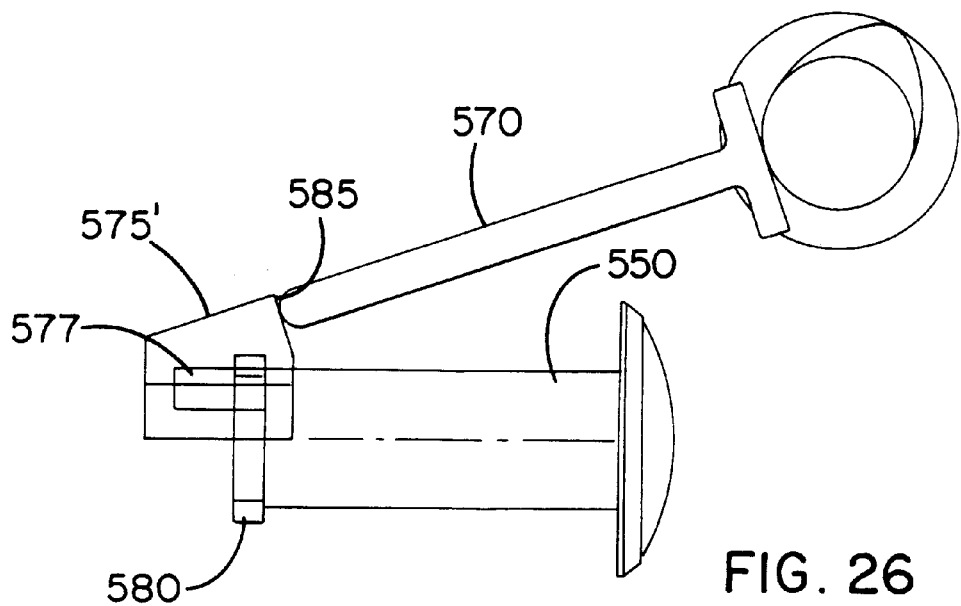
FIG. 26 is an isolated view of the valve train according to the alternative embodiment.
Figure 27:
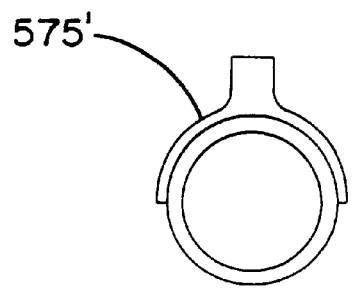
FIG. 27 is an end view showing the push rod saddle according the alternative embodiment of the invention.

A possible improvement could also be realized by increasing the valve size, which brings the possibility of improved breathing. An example of such a valve is seen in FIG. 25. Valve 550 has an even larger diameter that in the previous embodiment. Further, the hollow central cavity 555 has been extended the entire length of the valve. This not only allows for a significant increase in the internal radiating surface area, but significantly decreases valve mass and also allows the valve actuation spring 560 to be housed within the valve, as seen in FIG. 24. This greatly simplifies the structure and actuation of the valve. Instead of the relatively heavy rocker arms from the previous embodiment, this valve can be actuated by a light-weight push rod 570 engaging a valve boot 575. FIG. 24 shows a simplified valve boot 575. An alternative embodiment of boot 575' is shown in FIGS. 26 and 27. Boot 575' engages a ring 580 disposed on the valve 550. The boot, including an angled camming surface 585, includes a cutout 577 to reduce its mass while providing enhanced valve actuation. The boot, having a larger diameter than the valve, would ride on linear tracks on the inside wall of the valve sleeve, thus ensuring that the boot exerts only axial force of the valve.

A reduced weight in the valve actuation system should result in lower reciprocating mass, better lubrication, adjustment capabilities, cooling, and RPM capability. A simple mechanism may also be included so that the valves rotate during actuation. Rotation of the valves allows for more uniform heating of the valves, thus preventing the formation of hot spots which can cause valve distortion and knock during combustion. Cooling of the valve may also be enhanced by directing pressurized oil in the large hollow central cavity 555, the oil contacting the interior surface and carrying away heat.

An improvement of the design of the intake manifold could also lead to improved performance. In the previously-described embodiment, the intake manifold was fabricated with the use of simple carburation as the fuel delivery system. As is common with such systems, the cylinder furthest from the carburetor ran lean, while the cylinder closest to the carburetor ran with the richest mixture. Improvement could be achieved by use of a more accurate, functional and runner-equalized intake manifold, as well as by use of electronic fuel injection as opposed to carburation.

Another possible improved feature would be a reduced piston mass. In the previously-described embodiment, a prototype was made using a modified and existing casting to obtain the necessary piston crown shape. As a result, the piston had a weight that represented a 50 percent increase over a stock piston. By using a cone-shaped piston of reduced mass, significant improvement should be realized.

Of course, as with any engine, improvements could also be realized by properly adjusting an optimizing the timing of the engine. Further, any modifications which improve the serviceability or access to parts of the engine is preferred. Prevention of oil leakage and improved cooling capabilities are also desirable modifications to make to any engine.

While the above described modifications may potentially improve the performance of an engine according to the invention, the previously-described embodiment realizes a significant advancement over stock engines, as shown graphically in FIG. 15. That engine was able to achieve better mileage, and reduced emissions because of the unique structure of the engine. This structure lead to the improved functional characteristics described. In particular, the structure of the engine leads to an improved squish and swirl of the charge during the compression stroke. The shape of the combustion chamber, the extension of the valve stems across that chamber the shape of the piston head and the complemental shape of the cylinder head combine to lead to a combustion-induced vertical and horizontal swirling of the charge during the power stroke. This leads to a smoother, more even burn as well as a scrubbing action for removing unburned hydrocarbons from the combustion chamber walls. The tapered piston crown contributes to the improved performance as the swirling charge exiting from the thin, upstanding combustion chamber sweeps outwardly by contact with that crown-shaped head to further induce swirl and lead to a more complete burn of the charge as well as scrubbing of the cylinder walls. The design disclosed herein also offer lighter valves with enhanced cooling, lubricating and actuating capabilities.

There has thus been disclosed an improved internal combustion engine. Potential improvements have also been disclosed, and are intended to be within the scope of the present invention. Indeed, the invention embraces all modifications and equivalents to the disclosed embodiment as fall within the scope of the following claims.

What is claimed is:

1. An internal combustion engine including an overhead cam shaft for actuating reciprocating valves for selectively sealing and opening exhaust and intake ports in a combustion chamber, the engine further comprising a rocker arm mounted below the cam shaft in the cylinder head for pivotal movement about an axis, the rocker arm including a first arm with a cam pad for engaging a cam on the cam shaft and a second arm with a valve-engaging end, such that pivotal movement of the rocker arm causes movement of the valve, a rocker arm bracket mounted below the cam shaft and including a central slot including vertical sidewalls for receiving a portion of the rocker arm, the portion of the rocker arm and the vertical sidewalls forming an oil-receiving cavity for accumulating oil in the area of the cam pad, the cavity including crevices allowing for controlled leakage of the accumulated oil by means of gravity.

2. The internal combustion engine according to claim 1, wherein the valve is a poppet valve disposed in a bearing sleeve mounted in a sidewall of the combustion chamber, the bearing sleeve and poppet valve being angled downwardly away from the combustion chamber, and being in communication with the oil-receiving cavity, such that oil is received from the oil-receiving cavity and flows away from the combustion chamber.

3. The internal combustion engine according to claim 1, wherein the valve member is associated with a valve train mechanism, the valve train including a valve shoe which is fixed to a valve stem, and is actuated by the valve-engaging end of the rocker arm to disengage the valve from the port against which it seals.

4. The internal combustion engine according to claim 1, wherein the valve train also includes a stationary valve guide, the valve guide being generally cylindrical, and including a cut-away portion for receiving the valve-engaging end of the rocker arm, the valve guide further including a cup region disposed below the cut-away region for accumulating lubricating oil to thereby lubricate the joint between the rocker arm and the valve train.

* * * * *